United States Patent [19]

Taylor

[11] 4,027,044
[45] May 31, 1977

[54] FOOD PRODUCT AND METHOD FOR PREPARING SAME

[76] Inventor: Lawrence Huntington Taylor, P.O. Box 49-58, 48th St. P.O. Br., Union City, N.J. 07087

[22] Filed: June 8, 1976

[21] Appl. No.: 693,748

[52] U.S. Cl. .................. 426/134; 426/91; 426/94; 426/275; 426/96; 426/421
[51] Int. Cl.² ............................ A23L 1/00
[58] Field of Search .......... 426/132, 134, 90, 91, 426/92, 94, 89, 274, 275, 420, 421, 523, 96

[56] References Cited

UNITED STATES PATENTS

| | | | |
|---|---|---|---|
| 2,060,490 | 11/1936 | Borbely | 426/92 |
| 2,116,310 | 5/1938 | Harvey | 426/134 |
| 2,298,278 | 10/1942 | Clark | 426/94 |
| 2,815,530 | 12/1957 | Alexander | 426/421 X |
| 2,898,027 | 8/1959 | Scholle | 229/55 X |
| 3,190,441 | 6/1965 | Rausing | 229/55 X |
| 3,539,354 | 11/1970 | Colvin | 426/275 |
| 3,656,968 | 4/1972 | Allen | 426/275 |
| 3,690,898 | 9/1972 | Partyka | 426/275 |
| 3,804,955 | 4/1974 | Chow | 426/134 X |
| 3,804,956 | 4/1974 | Bongiovanni | 426/134 X |
| 3,830,944 | 8/1974 | Dimitriadis et al. | 426/92 |
| 3,949,135 | 4/1976 | Vercauteren | 426/127 X |

OTHER PUBLICATIONS

Foods of the World, Middle Eastern Cooking, Nickles, Time–Life Books, 1969, p. 35.

Primary Examiner—Steven L. Weinstein

[57] ABSTRACT

An arrangement of sliced food stuffs of variable meltability, absorbency, or juice/seasoning producing character so that the absorbent materials will be best suited in their sequential placement to best retain the juices or melt products during the cooking which may be broiled or cooked in a pan as all the exterior edges of each component slice fall even with and in the same plane as all other slices on the skewer thus insuring even cooking and full retention of all possible cooking liquids generated from within or exteriorly applied.

3 Claims, 1 Drawing Figure

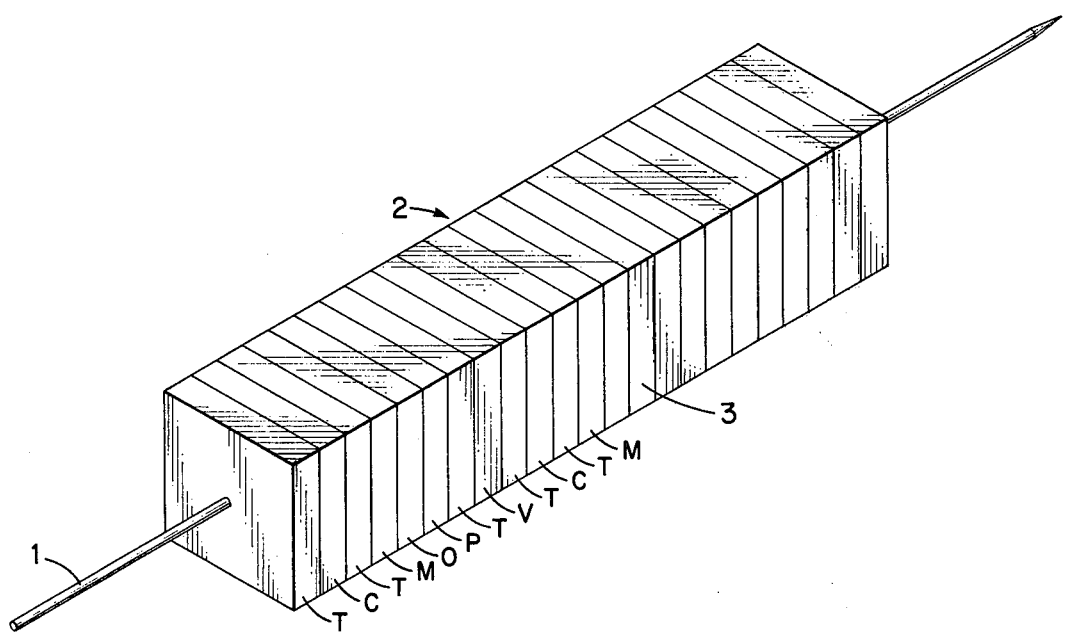

FOOD PRODUCT AND METHOD FOR PREPARING SAME

The accomplishment of this invention is that using this method food may be cooked in a manner that permits retention of juices and melted products like cheeses, meat, fats, and vegetable liquids.

The method provides that the food to be barbequed on a spit, is arranged in accordance with a special plan and trimmed also in accordance with the Food Barbeque Method.

First, the food must all be cut in similar sized squares, triangles or other uniform shapes suitable for cooking on a spit, so that when the components are assembled on the spit no piece of food projects further, or is indented more, than the rest of the pieces of food on the longitudinal flat sides of the spit thus to burn or cook more or less than the other pieces of food on the spit.

With the food arranged or trimmed so that all sides are flat or uniform in surface, the cooking surface is reduced in area Vs. an uneven surface and all cooks evenly and the heat by conduction and/or radiation is uniform.

The sequential arrangement of the foods according to the method facilitates the preferred cooking result because the method is to place pieces of absorbent food like toast next to the pieces of food that will melt at cooking temperatures like cheese, so that as the internal temperatures of the food pieces on the spit continue to rise the melting cheese will largely be absorbed by the pieces of toast next to it thus preventing it from dripping. Also, the toast slices can absorb meat or other juices otherwise lost by dripping while cooking.

Besides the obvious value of the method in providing absorbent components and arranging them where most functional, the system provides in the absorbent pieces, a further medium for including sauces, gravies, or seasonings, applied in the manufacture of the product by cooking or soaking the components or by spreading on the outside before or during cooking.

A further function of these bread, toast, or similar layers, is to contain or act as a base for chopped pieces, like onion, pepper, and the like prepared in gelatin, mayonaise, or other sheet or spread binders that will disolve into the components when heated.

Besides the obvious advantages of the spacing of differently performing ingredients and their interaction plus the uniformity of cooking with flat sides (longitudinally), the Barbequettes (barbeque spits) can be cooked in a flat pan with sauces or cooking oil instead of being grilled over an open fire or under a broiler flame as is customary with skewered foods. With some foods the Barbequette may be eaten cold without cooking, but in such case the precise arrangement and shape of the components is obviated, though the method is then primarily one of convenience.

In FIG. 1, there are two components 1 is a skewer and 2 is the barbequette with the food slices placed on the skewer for cooking, illustrating the flat sides 3, and sequential arrangement of certain types of food components essential to the method. The small letter indicators in FIG. 1. indicate the different types of food and their specialized arrangement in one form of barbequette with T being toast, C being cheese, M being meat, O being onion, P being pepper, V being vegetable or other food components.

The method by which a skewer is loaded is that toast or other absorbent food is used on both sides of cheese (or other meltable foods) to absorb the cheese as it melts. Similarly toast or other absorbent food is used to absorb meat or other juices produced in cooking. Where vegetable, basically non liquid producing foods are skewered the toast or equivalent layer may carry sauces for cooking or flavor though such seasoned slices may be used elsewhere.

The sides of the similary sized and shaped pieces shall be alligned or trimmed so as to make the sides of the barbequette or finished assemblage flat with all food coming to one plane on each side and reasonably packed together along the skewer.

I claim:

1. A skewered food product comprising a skewer and two basically different groups of food products, a first group of absorbent bakery products, and a second food group selected from the group consisting of meat, cheese, vegetable, and combinations thereof, said second food group producing some liquids or aromatics during cooking; said food products of both groups being sliced in variable thickness, but of exactly similar sized and straight-sided geometrical shape in plan view from the axis of the skewer, with such specially formed slices being arranged sequentially along the skewer and alternating from said absorbent slices to the slices of said second group and back to the absorbent slices so that for the length of the skewer the different types of food product lie next to and in contact with one another permitting and facilitating the absorbtion and retention by the absorbent slices of the various flavors, liquids and aromatics produced by the second grouping of sliced materials, with all slices being arranged on the skewer so that their exterior edges match and lie in exactly the same plane, thus producing a skewered product with flat sides most suitable for either pan frying by contact heat or by broiling, as either cooking process is preferred or dictated by circumstance, with no loss of benefit by the use of either cooking means.

2. A method of assembling certain specially selected and prepared types of food on a skewer for cooking so that the assembled food on the skewer may be alternatively suitable for such different types of cooking as pan frying or broiling and to offer as well, certain new and useful benefits with each type of cooking such as better retention of fluids and aromatics produced in cooking, and permitting cooking by conduction, sealing in flavors, as well as by exposure to radiant or convection heat transfer with the steps of the method comprising:

A. Providing foods of two general types, an absorbent food from the bread products group, either toasted or untoasted, and a second food material selected from the group consisting of meats, cheeses and vegetable and combinations thereof, said absorbent food material and second food material being prepared in slices of relatively variable thickness, but of exactly similar size and shape in plan, and all cut with straight, flat edges such that all the slices for each skewer have the same straight-sided geometric shape;

B. Placing the food slices on the skewer so that all of their exterior sides, in plan, will fall in the same plane and the slices when placed sequentially on the skewer in a stacked relationship will give the prepared skewer of food a flat surface on all longitudinal sides with the slices so placed in alternate order on the skewer that said absorbent slices will lie next to and in contact with, the slices of said second material so that the absorbent slices will retain to the maximum extent possible, such liquids and aromatics as are generated in cooking from the second materials themselves;

C. Cooking the skewered food either by pan frying in oils, sauces or seasoning, or alternatively by broiling.

3. The method of claim 2 wherein said absorbent food material additionally includes condiments and chopped flavor products in an edible, spreadable binder; said absorbent food material acting as a base for the spreadable material.

* * * * *